G. H. GARDNER.
Thill Coupling.
No. 76,183.  Patented March 31, 1868.
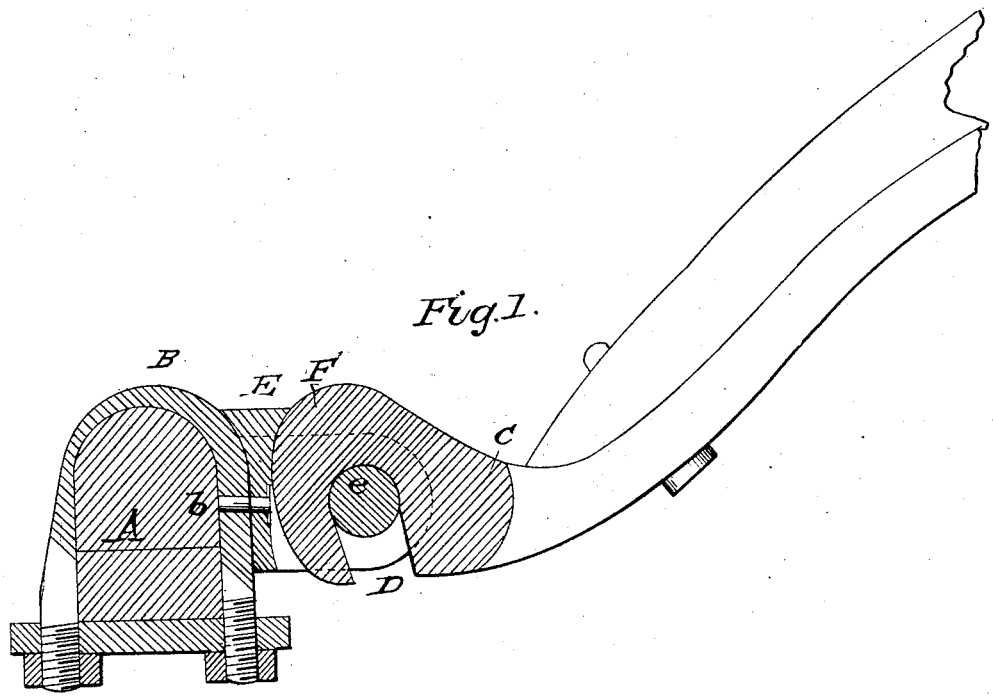
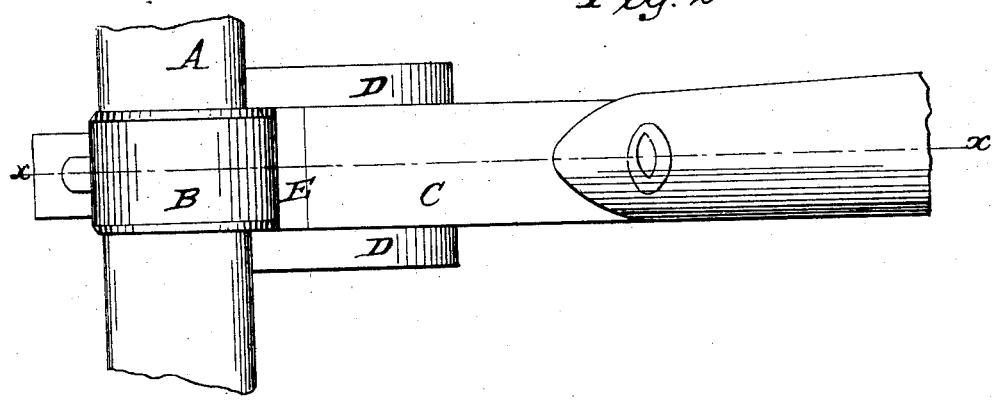

United States Patent Office.

GEORGE H. GARDNER, OF PHILADELPHIA, PENNSYLVANIA.

Letters Patent No. 76,183, dated March 31, 1868.

---

IMPROVED THILL-COUPLING.

---

The Schedule referred to in these Letters Patent and making part of the same.

---

TO ALL WHOM IT MAY CONCERN:

Be it known that I, GEORGE H. GARDNER, of Philadelphia, in the county of Philadelphia, and State of Pennsylvania, have invented certain new and useful Improvements in Thill-Couplings for Carriages; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

The object of my invention is to produce a safe, cheap, and simple coupling for attaching the thills or shafts of carriages, buggies, &c., when the thills are attached to the axle. In the drawings accompanying—

Figure 1 is a vertical section on the line $x$ $x$.

Figure 2 is a top plan view.

To the axle A, I attach a yoke, B, in the ordinary manner, and to the sides of the yoke I rigidly secure the two side plates or lugs, D D, these plates extending horizontally from the axle, as shown in figs. 1 and 2, they having firmly attached to them (by riveting or otherwise) a bolt, $e$, as shown in fig. 1, this bolt being parallel to the axle A. Between the plates D D, and on the face of the yoke, is placed a block of rubber, E, which is secured to the yoke by a rivet, $b$, as shown in fig. 1, this rivet passing through the yoke, and having a head on the inside, thus firmly securing the rubber in place, and preventing its loss when the thills are detached. To the hind end of the thills is secured a hook, C, its breadth being such as to allow of its passing between the plates D D, and having on its under side a slot or opening, as shown in fig. 1, the breadth of which is a little more than the diameter of the bolt $e$, so as to allow of its being hooked on to the bolt when in a proper position, the outer surface or end of this hook being eccentric to the bolt $e$ when the hook is in position. The slot is placed at such an angle in the hook C as to be perpendicular only when the front ends of the thills are on the ground.

To attach the thills the operation is as follows: The forward ends being placed upon the ground, the hind ends are lifted up and the hooks dropped in place. The forward ends being then lifted, the eccentric portion of the hook C is brought to bear snugly against the rubber E, and the rear arm of the hook brought under the bolt $e$, thus preventing all noise and rattling, as well as the danger of the thills becoming detached.

By these means I dispense with all loose bolts, straps, keys, springs, &c., and at the same time make a safe coupling, as the thills can by no means become disengaged, as they are always locked in place when the horse or other animal is harnessed up.

Having thus described my invention, what I claim is—

The thill-iron C, having the eccentric-head F and inclined slot D, in combination with the clip B, united by the bolt $e$ and the rubber E, all constructed and arranged as described.

GEORGE H. GARDNER.

Witnesses:
H. B. MUNN,
P. T. DODGE.